(12) United States Patent
Orzell et al.

(10) Patent No.: US 9,858,133 B2
(45) Date of Patent: Jan. 2, 2018

(54) TECHNIQUES FOR ASSESSING THE RESILIENCY OF A DISTRIBUTION COMPUTING SERVICE PROVIDED BY A COLLECTION OF INTERACTING SERVERS

(75) Inventors: Gregory S. Orzell, San Francisco, CA (US); Yury Izrailevsky, Saratoga, CA (US)

(73) Assignee: NETFLIX, INC., Los Gatos, CA (US)

( * ) Notice: Subject to any disclaimer, the term of this patent is extended or adjusted under 35 U.S.C. 154(b) by 413 days.

(21) Appl. No.: 12/886,138

(22) Filed: Sep. 20, 2010

(65) Prior Publication Data

US 2012/0072571 A1 Mar. 22, 2012

(51) Int. Cl.
| | | |
|---|---|---|
| *G06F 15/173* | (2006.01) | |
| *G06F 11/00* | (2006.01) | |
| *H04L 12/803* | (2013.01) | |
| *H04L 12/24* | (2006.01) | |
| *H04L 12/26* | (2006.01) | |
| *G06F 11/30* | (2006.01) | |

(52) U.S. Cl.
CPC ........ *G06F 11/008* (2013.01); *G06F 11/3055* (2013.01); *G06F 2201/815* (2013.01); *G06F 2201/865* (2013.01); *H04L 41/0893* (2013.01); *H04L 43/0817* (2013.01); *H04L 47/125* (2013.01)

(58) Field of Classification Search
CPC ............... G06F 11/008; G06F 11/3055; G06F 2201/815; G06F 2201/865; G06F 11/30; H04L 41/0893; H04L 43/0817; H04L 47/125
USPC .............................................. 709/224; 718/1
See application file for complete search history.

(56) References Cited

U.S. PATENT DOCUMENTS

| | | | |
|---|---|---|---|
| 6,694,346 B1 | 2/2004 | Aman et al. | |
| 7,478,149 B2 | 1/2009 | Joshi et al. | |
| 7,529,822 B2 * | 5/2009 | Joshi et al. | .................... 709/223 |
| 2008/0052719 A1 | 2/2008 | Briscoe et al. | |
| 2009/0276200 A1 * | 11/2009 | Beyer | ................... G06F 11/261 703/13 |

(Continued)

FOREIGN PATENT DOCUMENTS

| | | |
|---|---|---|
| JP | 2005050084 A | 2/2005 |
| JP | 2008197962 A | 8/2008 |
| WO | 2009126154 A1 | 10/2009 |

OTHER PUBLICATIONS

International search report for application No. PCT/US2011/052413 dated Feb. 8, 2012.

(Continued)

*Primary Examiner* — Ian N Moore
*Assistant Examiner* — Mewale Ambaye
(74) *Attorney, Agent, or Firm* — Artegis Law Group, LLP

(57) ABSTRACT

Techniques are disclosed for validating the resiliency of a networked application made available using a collection of interacting servers. In one embodiment, a network monitoring application observes each running server (or application) and at unspecified intervals, picks one and terminates it. In the case of a cloud based deployment, this may include terminating a virtual machine instance or terminating a process running on the server. By observing the effects of the failed server on the rest of the network application, a provider can ensure that each component can tolerate any single instance disappearing without warning.

22 Claims, 4 Drawing Sheets

(56) References Cited

U.S. PATENT DOCUMENTS

| | | | |
|---|---|---|---|
| 2009/0313447 A1* | 12/2009 | Nguyen .............. | G06F 11/1451 711/162 |
| 2010/0223378 A1* | 9/2010 | Wei ..................... | H04L 41/0896 709/224 |
| 2011/0107332 A1* | 5/2011 | Bash ................................ | 718/1 |
| 2011/0296000 A1* | 12/2011 | Ferris et al. .................. | 709/224 |
| 2012/0005670 A1* | 1/2012 | Driesen et al. ................... | 718/1 |

OTHER PUBLICATIONS

Notice of Preliminary Rejection (Non-Final) dated May 14, 2014 from Korean Patent Application No. 10-2013-7009995 entitled, "Validating the Resiliency of Networked Applications" (Translation).

Arai et. al., "Amazon EC2 & Amazon S3 for Beginners", G-CLOUD Magazine; Gijutsu-Hyohron Co., Ltd., Sep. 10, 2010, pp. 10-19.

Kokubu et al., "Hardware Faults Simulation in a Virtualization Enviornment for System Tests of High-Availabilty Cluster System", The Institute of Electronics, Information and Communication Engineers; Jul. 29, 2008, vol. 108, No. 181, 11 pages.

Extended European Search Report Application No. 11 82 7381, dated Apr. 28, 2016, 8 pages.

William Hoarau et al., "Easy fault injections and stress testing with FAIL-FCI", Jan. 1, 2005, XP055265742, Retrieved from the Internet: URL:http://www.lri.fr/bibli/rapports-internes/2005/RR1421.pdf.

Hoarau et al., "FAIL-FCI: Versatile fault injection", Future Generations Computer Systems, Elsevier Science Publishers. Amsterdam, NL, vol. 23, No. 7, May 17, 2007 (May 17, 2007), pp. 913-919, XP022081808, ISSN: 0167-739X, DOI: 10.1016/J.FUTURE.2007.01.005.

Brentn Chun Ed—Teruo Higashino: "DART: Distributed Automated Regression Testing for Large-Scale Network Applications", Aug. 18, 2005 (Aug. 18, 2005), Principles of Distributed Systems; [Lecture Notes in Computer Science;;LNCS], Springer-Verlag, Berlin/Heidelberg, pp. 20-36, XP019012325, ISBN: 978-3-540-27324-0.

* cited by examiner

TECHNIQUES FOR ASSESSING THE RESILIENCY OF A DISTRIBUTION COMPUTING SERVICE PROVIDED BY A COLLECTION OF INTERACTING SERVERS

BACKGROUND OF THE INVENTION

Field of Invention

Embodiments of the present invention generally relate to techniques for assessing the resiliency of a distributed computing service provided by a collection of interacting servers.

Description of Related Art

A broad variety of computing applications have been made available to users over computer networks. Frequently, a networked application may be provided using multiple interacting computing servers. For example, a web site may be provided using a web server (running on one computing system) configured to receive requests from users for web pages. The requests can be passed to an application server (running on another computing system), which in turn processes the requests and generate responses passed back to the web server, and ultimately to the users.

Another example includes a content distribution system used to provide access to media titles over a network. Typically, a content distribution system may include access servers, content servers, etc., which clients connect to using a content player, such as a gaming console, computing system, computing tablet, mobile telephone, network-aware DVD players, etc. The content server stores files (or "streams") available for download from the content server to the content player. Each stream may provide a digital version of a movie, a television program, a sporting event, user generated content, a staged or live event captured by recorded video, etc. Users access the service by connecting to a web server, where a list of content is available. Once a request for a particular title is received, it may be streamed to the client system over a connection to an available content server.

The software applications running on systems such as these are often updated as ongoing development results in patches to fix vulnerabilities or errors as well upgrades to make new features available. At the same time, the servers in a networked application may depend on one another in unforeseen or unintended ways and changes to one system may result in an unintended dependency on another. When this happens, if a server fails, then access to the networked application can be disrupted.

SUMMARY OF THE INVENTION

One embodiment of the invention disclosed herein provides a computer-implemented method for validating the resiliency of a networked application. The method may generally include identifying a plurality of active application components within a network used to provide the networked application and selecting, based on one or more selection criteria, at least one of the identified application components. This method may also include terminating the selected active application component and, following the termination of the selected active application component, monitoring one or more remaining active application components within the network.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
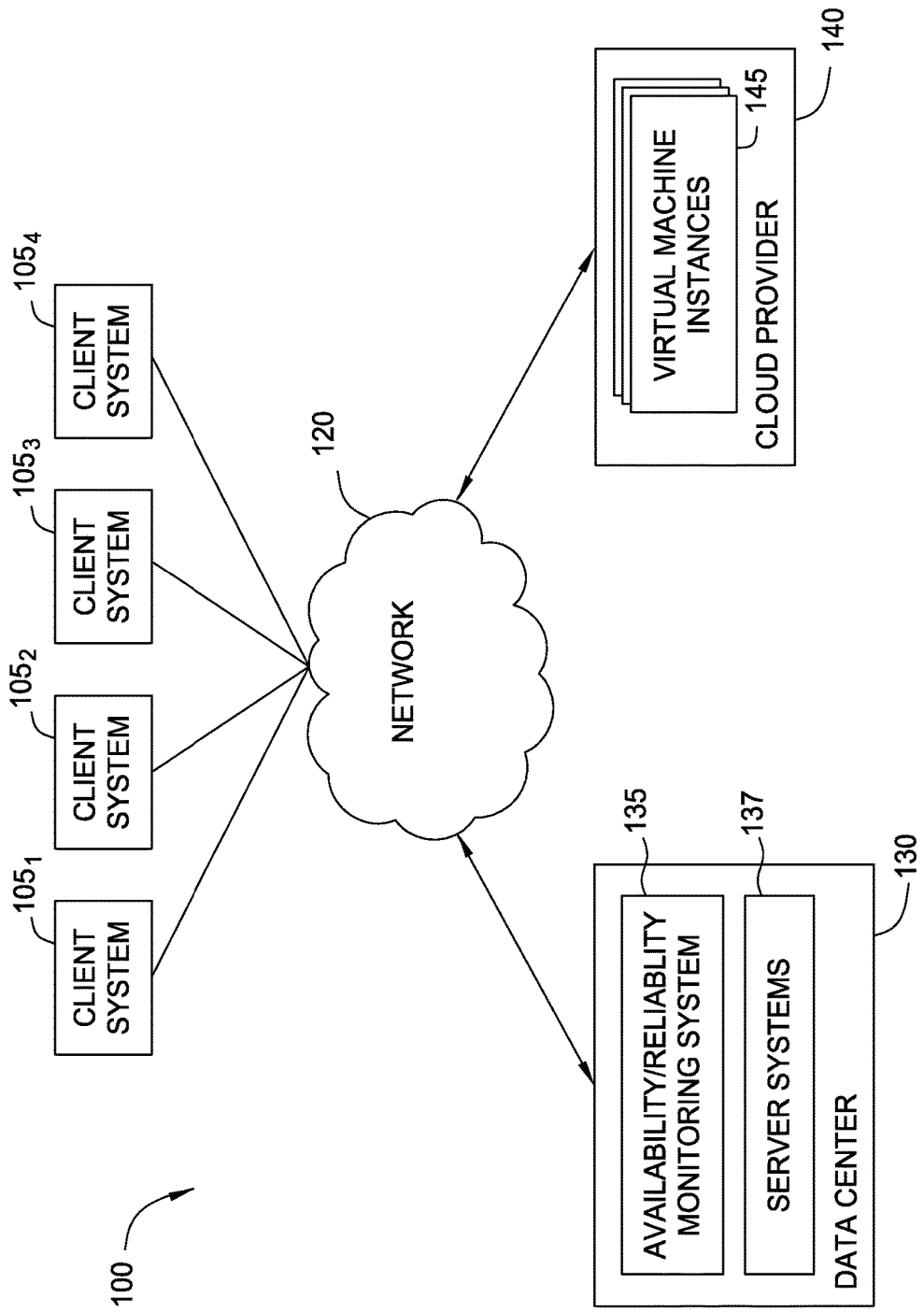
FIG. 1 illustrates a computing infrastructure configured to implement one or more aspects of the present invention.

Embodiments of the invention provide techniques for validating the resiliency of a networked application made available using a collection of interacting servers. For example, a network monitoring application may be configured to terminate an instance of a running application to determine whether systems that depend on the failed one can still function correctly (or degrade gracefully) following a random, unanticipated failure. Thus, the monitoring application may observe the impact of a server failure on other systems in the networked application in a controlled manner. This approach may be useful in cloud based deployments where any server can disappear at any time.

In one embodiment, the network monitoring application observes each running server (or application) at unspecified intervals, picks one and terminates it. In the case of a cloud based deployment, this may include terminating a virtual machine instance, terminating a process running on the server, etc. For physical servers in a data center, it could involve shutting off a server, terminating a process running on the server, closing a network connection on the server, etc. However performed, the participation of the selected server in the network application ends, cutting off the server (or application) from the rest of the network application.

By observing the effects of the failed server on the rest of the network application, a provider can ensure that each component can tolerate any single instance disappearing without warning. In one embodiment, the network monitoring application may be used in a test environment prior to deploying an update or patch to servers (or applications) in a production environment. Doing so allows the effects of the update or patch to be evaluated without being deployed to the production environment. Further, certain applications (or hosts or systems) can be excluded (or included) from possible termination using an exclusion/inclusion list. Similarly, in a cloud based deployment, the network monitoring application can be configured to terminate server instances that are members of an auto scaling group. Doing so allows the functioning of the auto scaling processes to be evaluated against, randomly occurring server failures. Thus, in various embodiments, the network monitoring application helps enforce requirements for fault tolerance, which might otherwise be lost over time as production systems are upgraded, patched, or otherwise changed in manners that create unintended or unwanted dependencies. More generally, any logical group of systems may be defined and tested by the network monitoring application described herein.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Further, particular embodiments of the invention are described using an example of a networked application used to stream movies, music, television programming, user generated content etc., over a data communications network to end-user client devices. However, it should be understood that embodiments of the invention may be adapted to validate the resiliency to individual system failure for a broad variety of networked applications or services. Accordingly, references to a streaming media service are merely illustrative and not limiting.

FIG. 1 illustrates a computing infrastructure 100 configured to implement one or more aspects of the present invention. In this example, the computing infrastructure 100 represents an infrastructure used to provide a networked application or service to client systems. As shown, server systems 137 at a data center 130 and virtual machine instances 145 running at cloud provider 140 are used to provide a network application or service to clients $105_{1-4}$ over a network 120. Additionally, the data center 130 includes an availability/reliability monitoring system 135.

As noted, embodiments of the invention may used to validate the resiliency of virtual machine instances 145 deployed using a cloud computing infrastructure made available by cloud provider 140. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtual machine instances spawned by the user). A user can access any of the resources that reside in the cloud at any time and from anywhere. Once provisioned, a virtual machine instance 145 provides an abstraction of a computing server, and a user can generally install and execute applications on the virtual machine instance 145 in the same manner as thought they controlled the physical computing server represented by the virtual machine instance 145.

In context of the present invention, a service provider may deploy servers or applications on virtual machine instance 145 and allow clients 105 to connect to and access the applications (e.g., a streaming media service) in same manner as accessing physical server systems 137 in data center 130. At the same time, as the service provider can rapidly scale the service simply by spawning additional virtual machine instances 145. This allows the provider to respond to peak demand periods without having to build and maintain a large computing infrastructure at the data center 130. The cloud provider 140 may provide an auto scaling feature used to automatically scale up or down the number of virtual machine instances 145 allocated to a given application (or application component) based on its needs at any given time.

However, as service provider does not control the underlying computing hardware, the servers or applications executing on the virtual machine instances 145 should be configured to tolerate any single virtual instance (or service provided by the virtual machine instance) disappearing without warning. Accordingly, as described in greater detail below, monitoring system 135 may include an application program configured to periodically terminate an instance of a running application on the server systems 137 or virtual machine instances 145 and observe the impact on the service overall (in either production or test environments). And may also ensure that, following the termination of a virtual machine instance, instances associated with an auto scaling group are properly scaled. In cases where unknown or unwanted dependencies are identified, the applications may be refactored as appropriate.

Figure 2:
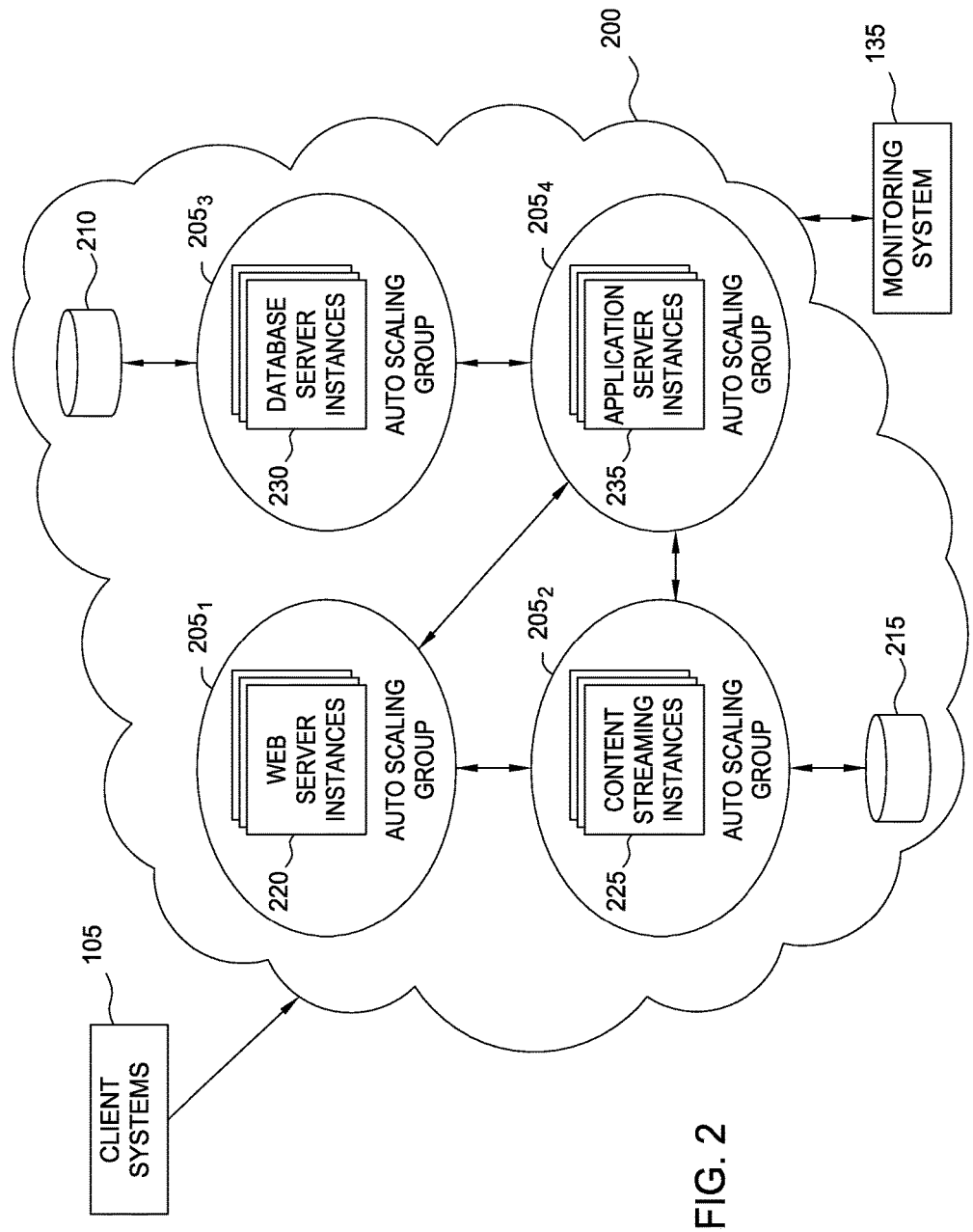
FIG. 2 illustrates a plurality of interacting server instances in a cloud computing environment, according to one embodiment of the present invention.

FIG. 2 illustrates a plurality of interacting server instances in a computing cloud 200, according to one embodiment of the invention. Illustratively, computing cloud 200 provides an example of a computing infrastructure used to provide a streaming media service to client systems. Of course, as noted above, computing cloud 200 could be used to provide a broad variety of computing services to clients 105.

As shown, the computing cloud 200 includes virtual machine instances (220, 225, 230 and 235) allocated among four different auto scaling groups $205_{1-4}$. Each auto scaling group may be associated with a minimum and/or maximum number of instances that should be provisioned, based on demand for services. In this example, a first auto scaling group $205_1$ includes web server instances 220 used to receive initial requests from client systems 105. Once received, the request is passed to one of the application server instances 235 in a second auto scaling group $205_4$, which may generate content for a web page passed back to the web server instance 220, where it is served to a requesting client system 105. For example, an initial web page may include a form allowing a user submit credentials in order to access streaming media content. In such a case, the credentials are passed back to the web server instance 220 and to the application server instance 235. And in turn, the application server 235 may validate the credentials by communicating with one of the database server instances 230 in a third auto scaling group $205_3$. For example, the database server instance 230 may retrieve information from a database 210 indicating a subscription status for a user, determined using the credentials. Once authenticated, the application server instance 235 generates web pages showing the media titles available for streaming passed to the client 105 or the web server instance 220.

Thereafter, when a client requests to stream a title, one of the content streaming instances 225 (in a fourth auto scaling group $205_2$) retrieves a streaming media data from a content database 215 and transmits it to the requesting client system 105. In a case where the streaming media service is hosted from a provider's data center, the virtual machine instances 220, 225, 230 and 235 generally correspond to physical computing systems in the data center.

In one embodiment, the monitoring system 135 may be configured to evaluate the resiliency of the streaming media service provided by the computing cloud 200 (or the systems/applications in a provider's data center). For example, the monitoring system 135 may select to terminate one of the instances 220, 225, 230 or 235 (or an instance selected from a specified one of the auto scaling groups $205_{1-4}$. The selection may be done at random intervals or may occur on a scheduled basis. Terminating an instance allows the provider to evaluate whether systems that depend on the terminated one continue to function correctly (or degrade gracefully) following a random, unanticipated failure. For example, if one of the application server instances 235 is terminated, the ability of content streaming instances 225 to continue to stream content to clients 105 may be observed. Thus, the monitoring system 135 allows users to observe the impact of a server failure on other systems in the networked application in a controlled manner In one embodiment, some of the instances 220, 225, 230 and 235 may be excluded from being eligible to be terminated by the monitoring system 135. Individual instances may be excluded using an exclusion list. Such a list may exempt individual instances from being eligible for termination using an instance ID. For example, an instance used as an authentication server may be excluded from eligibility for termination. Similarly, if the failure of one instance (or an application provided by that instance) is known to be disruptive to others, it may be excluded from eligibility for termination.

Additionally, instances may be exempted based on group membership. For example, the monitoring system 135 may be configured to exclude all instances in a specified auto scaling group. Another example would be to exclude all instances which belong to a specific security group. Note, in this context, a security group is a group of systems to which a group of firewall-like access rules applied to any instance which is a member of the group. For example, the database server instances 230 could be a member of a "database" group that allows access to the application server instances 235, but blocks access to the web server instances 220. Similarly, the web server instances 220 could belong to a "web group," and be granted access to the public internet on a specified port (e.g., port 80 for HTTP traffic). Of course, other logical groups of systems may be defined and tested by the network monitoring application apart from the auto scaling and security group examples discussed above Note, that while shown outside of the computing cloud 200, the monitoring system 135 may itself be running a virtual machine instance spawned in the computing cloud 200.

Figure 3:
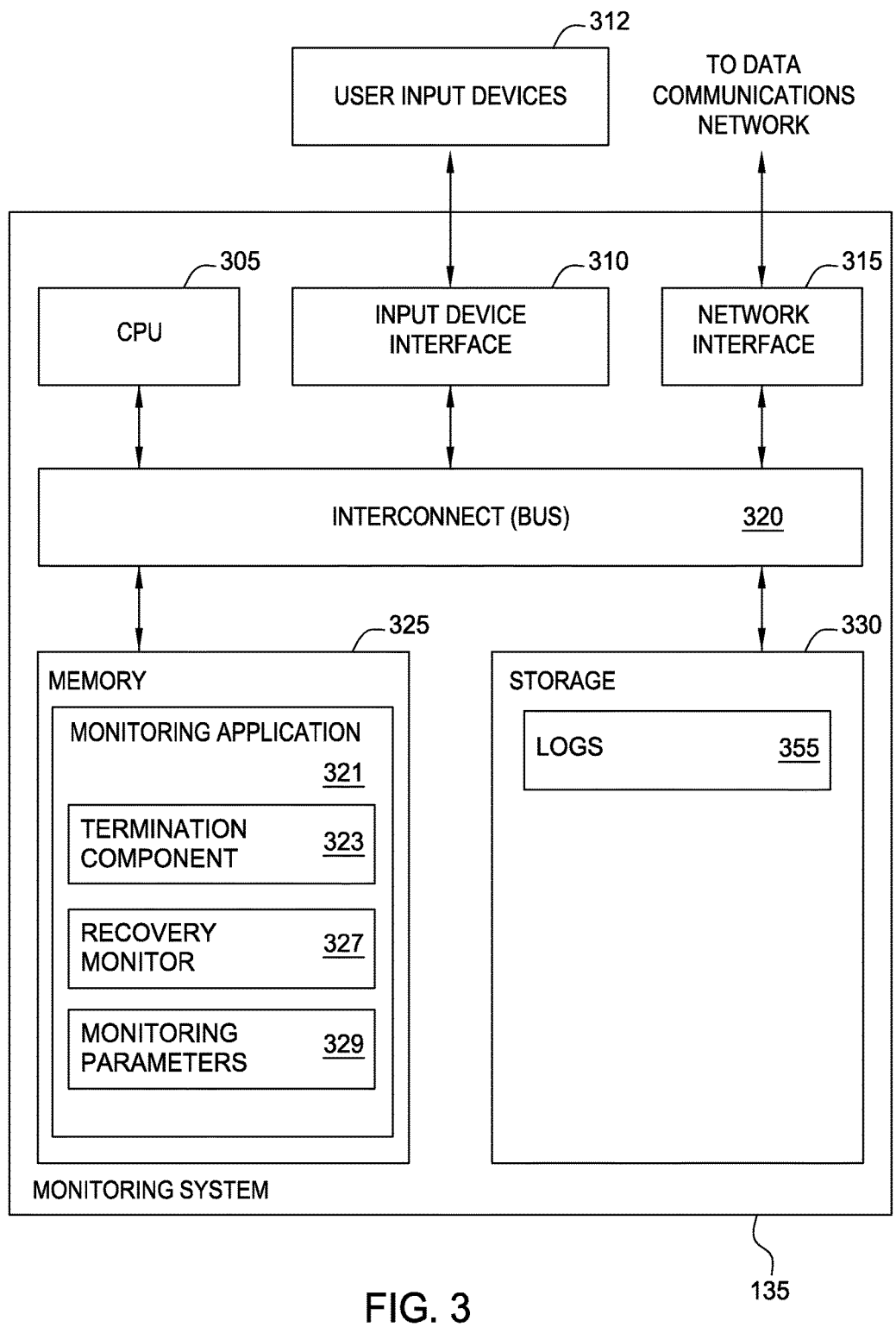
FIG. 3 is a view of a computing system which includes a resiliency monitoring application, according to one embodiment of the invention.

FIG. 3 is a view of the monitoring system 135 which includes a resiliency monitoring application, according to one embodiment of the invention. As shown, the monitoring system 135 includes, without limitation, a central processing unit (CPU) 205, a network interface 315, an interconnect 320, a memory 325, and storage 330. The monitoring system 135 may also include an I/O device interface 310 connecting I/O devices 212 (e.g., keyboard, display and mouse devices) to the monitoring system 135.

In general, the CPU 305 retrieves and executes programming instructions stored in the memory 325. Similarly, the CPU 305 stores and retrieves application data residing in the memory 325. The interconnect 320 facilitates transmission of programming instructions and application data between the CPU 305, I/O devices interface 310, storage 330, network interface 315, and memory 325. CPU 305 is included to be representative of a single CPU, multiple CPUs, a single CPU having multiple processing cores, and the like. And the memory 325 is generally included to be representative of a random access memory. The storage 330 may be a disk drive storage device. Although shown as a single unit, the storage 330 may be a combination of fixed and/or removable storage devices, such as fixed disc drives, floppy disc drives, tape drives, removable memory cards, optical storage, network attached storage (NAS), or a storage area-network (SAN).

Illustratively, the memory 325 contains a monitoring application 321 and storage 330 includes monitoring logs 335. As shown, the monitoring application 321 includes a termination component 323, a recovery monitor 327, and instance monitoring parameters 329. As noted above, the monitoring application 321 may provide a software application configured to periodically select and terminate a running virtual machine instance, server, application or other component used in a networked application (e.g., one of the virtual machine instances 220, 225, 230 or 230 in cloud computing cloud 200 or a application running on a server in a provider's data center). For convenience, reference will be made terminating "instances," but, it will be understood that terminating any other component is contemplated.

In one embodiment, the termination component 323 selects which instance to terminate (as well as when to terminate an instance) according to the monitoring parameters 329. The selection parameters may specify criteria such as excluded instances, or groups of instances, times of day, etc., which the termination component 323 may use to make a termination selection. For example, the monitoring parameters 329 may specify to select an instance at random (or select from a group at random) at any time or during a specified time interval.

Once an instance is selected (and terminated) the recovery monitor 327 may observe the actions of the remaining instances of a networked application, and generate corresponding information which recovery monitor 327 then stores the information in logs 335. The content of logs 335 may include information specified by the monitoring parameters 329 as well as include the logging data created natively by the instances (or applications running on an instance). That is, the applications running on an instance may generate logs depending on the applications running thereon (e.g., an access history log for a web-server).

Figure 4:
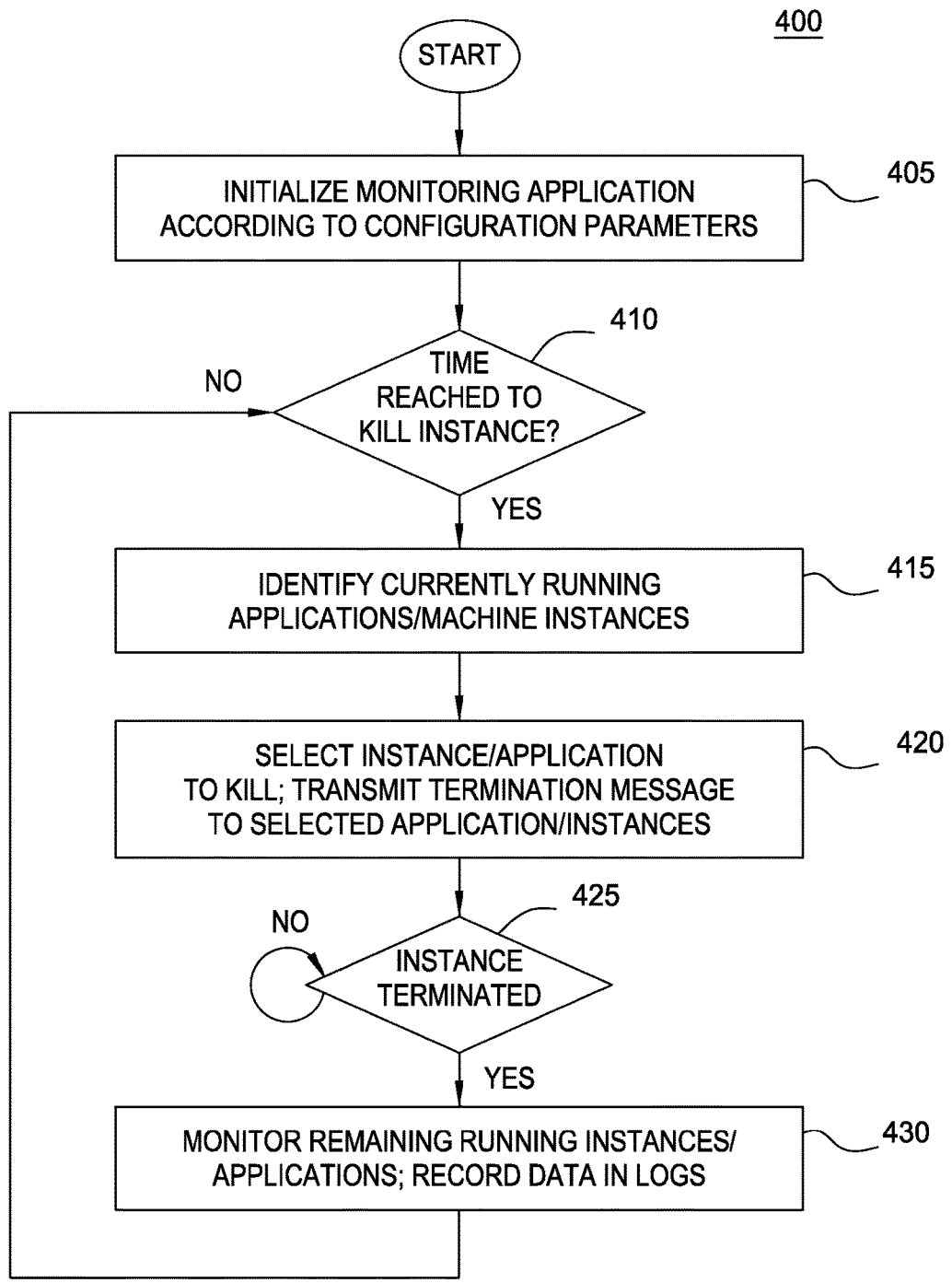
FIG. 4 further a method for validating the resiliency of networked applications, according to one embodiment of the present invention.

FIG. 4 illustrates a method 400 for validating the resiliency of networked applications, according to one embodiment of the present invention. As shown, the method 400 begins at step 405 where the monitoring application is initialized according to the configuration specified by the monitoring parameters. For example, the configuration parameters may specify criteria for determining when to select an instance to terminate, as well as for selecting which instance, application, or server, to terminate. At step 410, the monitoring application waits until reaching the time to terminate a running instance. Once reached, at step 415, the monitoring application identifies a plurality of active application components (e.g., active virtual machine instances, applications, or processes) being used to provide a network application.

At step 420, the monitoring application selects a virtual machine instance (or process or application) to terminate. Once selected, the monitoring application transmits a message to kill the selected instance. For example, in the case of a virtual machine instance, the monitoring application may transmit a terminate instance message to the cloud network.

Alternatively, the monitoring application may shutdown a server program (e.g., an HTTP web server) on a virtual machine instance (or on a data center server) or use mechanisms provided an operating system to kill a process.

At step 425, the monitoring application waits for the selected instance to terminate (or otherwise shutdown or cease executing). Following the termination of the selected instance, at step 430, the monitoring application observes the behavior of the remaining instances (or applications) and records log data to capture how the disappearance of the terminated instance impacts the rest of the network application. By observing the effects of the terminated on the rest of the network application, a provider can ensure that each component can tolerate any single instance disappearing without warning.

Advantageously, embodiments of the invention provide techniques for validating the resiliency of a networked application made available using a collection of interacting servers. In one embodiment, a network monitoring application observes each running server (or application) and at unspecified intervals, picks one and terminates it. In the case of a cloud based deployment, this may include terminating a virtual machine instance or terminating a process running on the server. Doing so may test the effectiveness of an auto-scaling (or other logical group of systems) made available by a cloud service provider. Additionally, some systems (or groups of systems) may be excluded from being eligible for termination by the network monitoring application (e.g., systems belonging to a security group).

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Therefore, the scope of the present invention is determined by the claims that follow.

We claim:

1. A method for validating the resiliency of a networked application that is implemented by a computing system, the method comprising:
   identifying a plurality of active application components within a network used to provide the networked application, wherein each of the plurality of active application components corresponds to a different function of the networked application, each function performed by a different auto scaling group included in a plurality of auto scaling groups, wherein a number of virtual machine instances included in each auto scaling group is automatically scaled separately from other auto scaling groups included in the plurality of auto scaling groups based on demand for the function of the networked application performed by the auto scaling group;
   selecting a first virtual machine instance based on the first virtual machine instance being a member of a first auto scaling group included in the plurality of auto scaling groups;
   terminating an aspect of the first virtual machine instance to simulate a random failure of a first active application component that corresponds to the first auto scaling group; and
   following the termination of the aspect of the first virtual machine instance, monitoring one or more remaining active application components within the network.

2. The computer-implemented method of claim 1, wherein each auto scaling group included in the plurality of different auto scaling groups specifies at least one of a minimum number of virtual machine instances to spawn within the auto scaling group and a maximum number of virtual machine instances to spawn within the auto scaling group.

3. The computer-implemented method of claim 1, wherein selecting the first virtual machine instance is further based on selection criteria that exclude virtual machine instances that are members of a security group specifying one or more network access rules applied to the members of the security group.

4. The computer-implemented method of claim 1, wherein terminating the aspect of the first virtual machine instance comprises terminating execution of the selected virtual machine instance within the computing cloud.

5. The computer-implemented method of claim 1, wherein the aspect of the first virtual machine instance comprises a specified process executing on the first virtual machine instance, and wherein terminating the aspect of the first virtual machine instance comprises halting execution of the specified process.

6. The computer-implemented method of claim 1, further comprising creating one or more log entries recording the impact on the remaining active application components resulting from the termination of the aspect of the first virtual machine instance.

7. A non-transitory computer-readable storage medium including instructions that, when executed by a processing unit, cause the processing unit to perform an operation for validating the resiliency of a networked application, the operation comprising:
   identifying a plurality of active application components within a network used to provide the networked application, wherein each of the plurality of active application components corresponds to a different function of the networked application, each function performed by a different auto scaling group included in a plurality of auto scaling groups, wherein a number of virtual machine instances included in each auto scaling group is automatically scaled separately from other auto scaling groups included in the plurality of auto scaling groups based on demand for the function of the networked application performed by the auto scaling group;
   selecting a first virtual machine instance based on the first virtual machine instance being a member of a first auto scaling group included in the plurality of auto scaling groups;

terminating an aspect of the first virtual machine instance to simulate a random failure of a first active application component that corresponds to the first auto scaling group; and following the termination of the aspect of the first virtual machine instance, monitoring one or more remaining active application components within the network.

8. The non-transitory computer-readable storage medium of claim 7, wherein each auto scaling group included in the plurality of different auto scaling groups specifies at least one of a minimum number of virtual machine instances to spawn within the auto scaling group and a maximum number of virtual machine instances to spawn within the auto scaling group.

9. The non-transitory computer-readable storage medium of claim 7, wherein selecting the first virtual machine instance is further based on selection criteria that exclude virtual machine instances that are members of a security group specifying one or more network access rules applied to the members of the security group.

10. The non-transitory computer-readable storage medium of claim 7, wherein terminating the aspect of the first virtual machine instance comprises terminating execution of the selected virtual machine instance within the computing cloud.

11. The non-transitory computer-readable storage medium of claim 7, wherein the aspect of the first virtual machine instance comprises a specified process executing on the first virtual machine instance, and wherein terminating the aspect of the first virtual machine instance comprises halting execution of the specified process.

12. The non-transitory computer-readable storage medium of claim 7, wherein the operation further comprises creating one or more log entries recording the impact on the remaining active application components resulting from the termination of the aspect of the first virtual machine instance.

13. A system, comprising:
a processor; and
a memory containing a program, which, when executed on the processor, performs an operation for validating the resiliency of a networked application, the operation comprising:
identifying a plurality of active application components within a network used to provide the networked application, wherein each of the plurality of active application components corresponds to a different function of the networked application, each function performed by a different auto scaling group included in a plurality of auto scaling groups, wherein a number of virtual machine instances included in each auto scaling group is automatically scaled separately from other auto scaling groups included in the plurality of auto scaling groups based on demand for the function of the networked application performed by the auto scaling group;
selecting a first virtual machine instance based on the first virtual machine instance being a member of a first auto scaling group included in the plurality of auto scaling groups;
terminating an aspect of the first virtual machine instance to simulate a random failure of a first active application component that corresponds to the first auto scaling group; and
following the termination of the aspect of the first virtual machine instance, monitoring one or more remaining active application components within the network.

14. The system of claim 13, wherein each auto scaling group included in the plurality of different auto scaling groups specifies at least one of a minimum number of virtual machine instances to spawn within the auto scaling group and a maximum number of virtual machine instances to spawn within the auto scaling group.

15. The system of claim 13, wherein selecting the first virtual machine instance is further based on selection criteria that exclude virtual machine instances that are members of a security group specifying one or more network access rules applied to the members of the security group.

16. The system of claim 13, wherein terminating the aspect of the first virtual machine instance comprises terminating execution of the selected virtual machine instance within the computing cloud.

17. The system of claim 13, wherein the aspect of the first virtual machine instance comprises a specified process executing on the first virtual machine instance, and wherein terminating the aspect of the first virtual machine instance comprises halting execution of the specified process.

18. The system of claim 13, wherein the operation further comprises creating one or more log entries recording the impact on the remaining active application components resulting from the termination of the aspect of the first virtual machine instance.

19. The computer-implemented method of claim 1, wherein the different functions performed by the plurality of different auto scaling groups are selected from a group consisting of a web server function comprising receiving initial requests from client instances, an application server function comprising generating web content, a database server function comprising retrieving credentials from a database, and a content streaming function comprising retrieving and transmitting media data to client devices.

20. A method for validating the resiliency of a networked application that is implemented by a computing system, the method comprising:
identifying a plurality of active application components within a network used to provide the networked application, wherein each of the plurality of active application components corresponds to a different virtual machine instance executing in a computing cloud;
selecting at least one of the identified application components based on a corresponding virtual machine instance being a member of a first auto scaling group included in a plurality of different auto scaling groups, wherein selecting the at least one of the identified application components is further based on an exclusion list that lists one or more virtual machine instances that should not be selected, wherein the exclusion list includes an instance identifier (ID) for each virtual machine instance listed in the exclusion list;
terminating the selected active application component to simulate a random failure of the selected active application component within the networked application; and
following the termination of the selected active application component, monitoring one or more remaining active application components within the network.

21. The non-transitory computer-readable storage medium of claim 7, wherein the different functions performed by the plurality of different auto scaling groups are selected from a group consisting of a web server function comprising receiving initial requests from client instances, an application server function comprising generating web content, a database server function comprising retrieving credentials from a database, and a content streaming function comprising retrieving and transmitting media data to client devices.

22. The system of claim 13, wherein the different functions performed by the plurality of different auto scaling groups are selected from a group consisting of a web server function comprising receiving initial requests from client instances, an application server function comprising generating web content, a database server function comprising retrieving credentials from a database, and a content streaming function comprising retrieving and transmitting media data to client devices.

* * * * *